United States Patent [19]

Bentson

[11] 4,407,189
[45] Oct. 4, 1983

[54] ROAST SPIT

[75] Inventor: Wade Bentson, San Francisco, Calif.

[73] Assignee: AMCO Corporation, Chicago, Ill.

[21] Appl. No.: 397,547

[22] Filed: Jul. 12, 1982

[51] Int. Cl.³ .............................................. A47J 37/04
[52] U.S. Cl. ........................ 99/421 HH; 99/421 HV;
  99/421 R; 211/198; 211/204
[58] Field of Search ................ 99/419, 421 R, 421 H,
  99/421 HH, 421 HV; 126/30, 9 B; 211/191,
  198, 200, 204, 206

[56] References Cited

U.S. PATENT DOCUMENTS

| | | | |
|---|---|---|---|
| 77,349 | 4/1868 | Bigelow | 99/421 H |
| 2,634,674 | 4/1953 | Irwin | 99/419 |
| 3,059,568 | 10/1962 | Fortis | 99/421 H X |
| 3,081,694 | 3/1963 | Lipsey | 99/421 HV X |

Primary Examiner—Billy J. Wilhite
Assistant Examiner—Christine A. Peterson
Attorney, Agent, or Firm—Laff, Whitesel, Conte & Saret

[57] ABSTRACT

A wire cooking rack has a horizontal rectangular supporting frame, with main panels hinged to opposing ends thereof. A locking support bracket is welded to each of the opposite ends of the rectangular frame. These brackets lock and hold the hinged panels, preferably in a slightly over center position, so that the weight of anything mounted on or supported by the rack tends to push the hinged panels toward a more firmly secured position, against the support brackets. A number of skewer positions are formed, at different heights, on the main panels, and on secondary panels secured thereto, in order to provide many different optional skewer support positions and to contribute to a firm support of many different kinds, sizes, and shapes of foods.

5 Claims, 7 Drawing Figures

ROAST SPIT

This invention relates to wire racks and more particularly to racks which are useful for supporting foods of various forms for and during cooking.

Many different kinds of foods are best cooked when suspended in an oven, over or under a fire, or adjacent a heat source. Often the food is first placed on a spit or skewer, which is then suspended on a supporting rack. Exemplary of such foods are sausage, bacon, chops, ribs, roasts, poultry, shish kebobs, brochette, corn, potatoes, and the like. These foods come in a number of different sizes, shapes, and characteristics. For example, a large turkey could weigh many pounds and occupy a substantially large physical volume, while a few small potatoes could weigh a few ounces and occupy a very little or almost no space.

Likewise, there is a great variance of cooking practices. Some people like to cook in a conventional oven while others like to cook over charcoal. Some people may wish to cook over a camp fire, which others like to cook under a broiler. Thus, there are a great many different places and ways for using a rack of the described type.

Another problem is that this great variety of foods and uses leads to a need for both a minimum size and a maximum size device, which is small enough to roast a potato and is large enough to support a turkey, for example. When the rack is folded or disassembled into a smaller form for storage, problems are created by making it complicated to use, by sacrificing its mechanical strength and stability, or the like.

Accordingly, an object of the invention is to provide new and improved cooking racks, having a substantial flexibility of use. Here an object is to provide racks which are easy to fold into a small space for storage or to open into a large space for supporting a large item, such as a chicken, turkey, or roast, for example. In particular, an object is to provide a cooking rack for centering a roast or the like, in an oven, with a free and unhampered circulation of air entirely around the roast. In this connection, an object is to provide a sturdy rack which can support a relatively heavy item without danger of collapsing.

Another object of the invention is to provide a food rack which is equally well suited for use with small volume and light weight foods or with large volume and heavy weight foods.

Still another object of the invention is to provide an easily folding rack which opens to, and locks in, a self supporting position.

Another object is to provide a rack which accomplishes the foregoing objects and yet is easy to clean.

In keeping with an aspect of this invention, these and other objects are accomplished by a wire rack having a horizontal rectangular supporting frame, with main panels hinged to opposing ends of the frame. A locking support bracket is welded to each of the opposite ends of the rectangular frame. These brackets lock and hold the hinged panels in a slightly over center position so that the weight of anything mounted on or supported by the rack tends to push the hinged panels toward a more firmly secured position, against the support brackets. A number of skewer positions are formed, at different heights, on the main panels and on secondary panels secured thereto in order to provide many different optional positions and to contribute to the firm support of many different kinds, shapes, and sizes of foods.

A preferred embodiment of the invention is shown in the attached drawings, in which.

Figure 7:
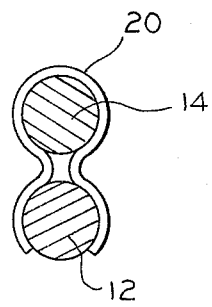
FIG. 7 is a cross-section of the hinge taken along line 7—7 of FIG. 4.

The inventive rack 10 includes a generally rectangular, horizontal support frame 12 having a pair of opposing or main panels 14, 16 hinged at points 18, 20, 22, 24 to the opposite ends of the frame. The hinges are strap iron, best seen in FIG. 7 as having an open ended generally "8-shaped" configuration which snaps over the two adjacent wires of frame 12 and panels 14, 16.

Figure 3:
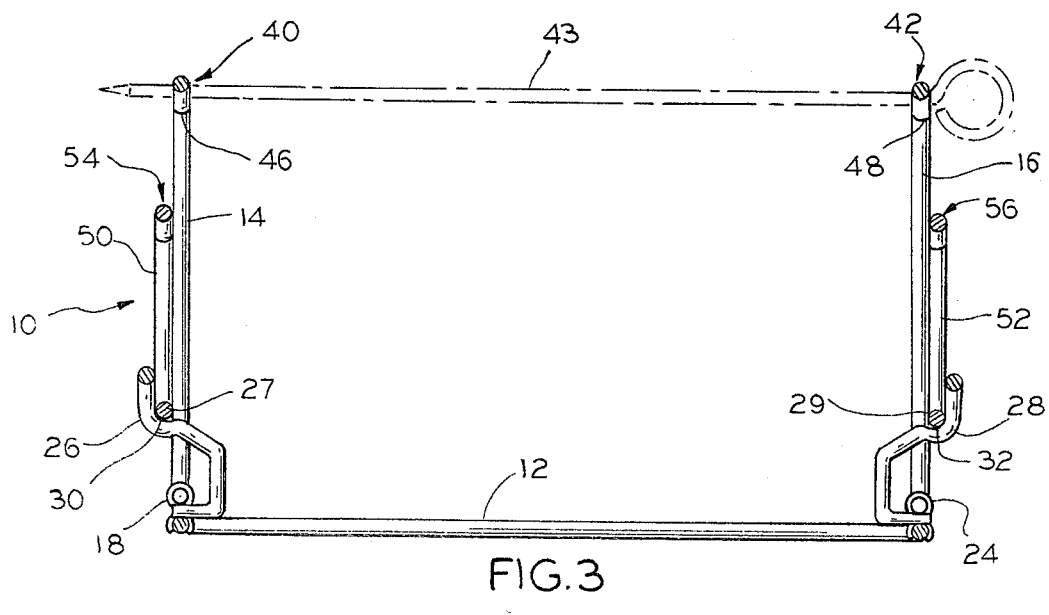
FIG. 3 is a side elevation view of the rack locked in an open position, with one exemplary skewer in place.
Figure 6:
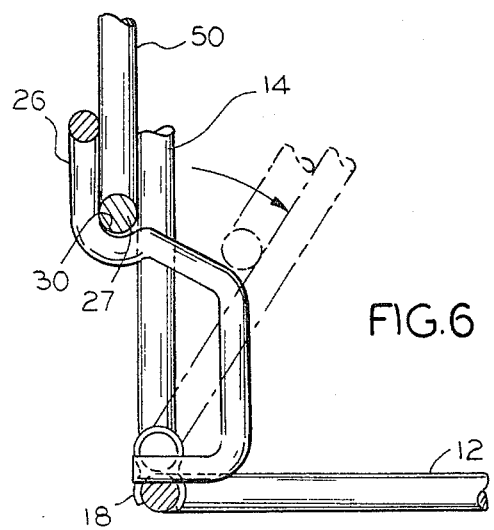
FIG. 6 is a side elevation showing the locking and supporting mechanism for the end panel.

A locking support bracket 26, 28 is welded to the center of each of the frame ends. Each bracket 26, 28 has a panel support and lock cove 30, 32 (FIGS. 3, 6) which extends slightly outside the perimeter of the horizontal frame so that the main panels 14, 16 must move slightly over center before they reach the load support position. This way, any weight acting downwardly upon the main panels 14, 16 tends to push them into the coves more firmly and against the support. The main panel locking occurs because the areas 30, 32 form a cove into which a bar 27, 29 on the main panel snaps. To release the lock, either the brackets 26, 30 must be pushed downwardly or the bars 27, 29 must be lifted enough to escape from the cove. Usually, it is a little easier to lift the bars, although a little of each motion generally occurs.

Figure 4:
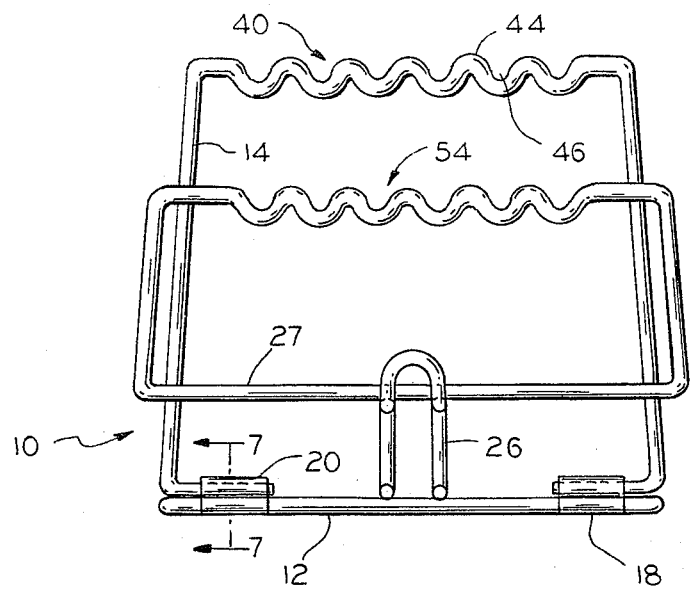
FIG. 4 is an end elevation of the rack, in an open position.

The upper edges 40, 42 of the two main panels 14, 16 have a generally serpentine configuration, forming successive peaks (as at 44, FIG. 4) and valleys (as at 46). The individual peaks and valleys on the two main panels 14, 16 are opposed to each other. Therefore, each pair of corresponding and opposing valleys (46, 48 [FIG. 3] for example), forms a support for one of the skewers 43.

Figure 1:
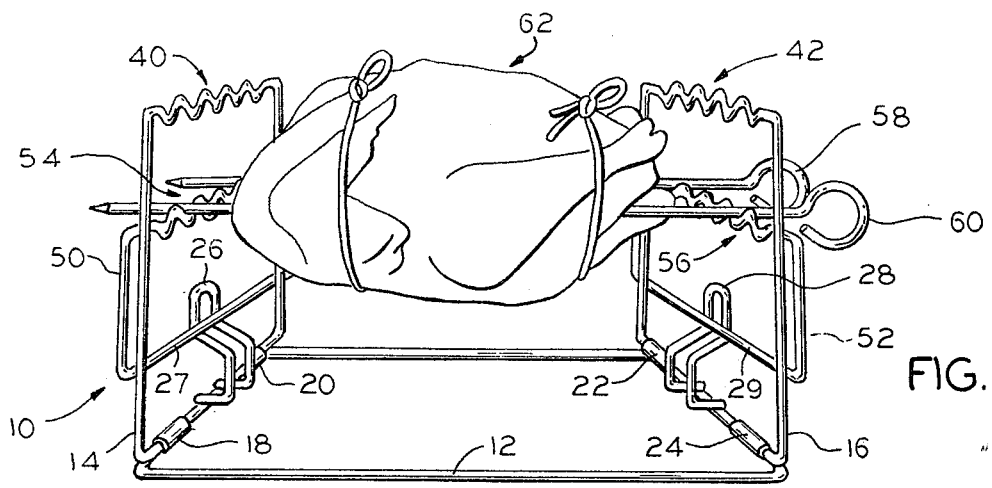
FIG. 1 is a perspective view of the inventive rack supporting an exemplary turkey, in a cooking position.
Figure 2:
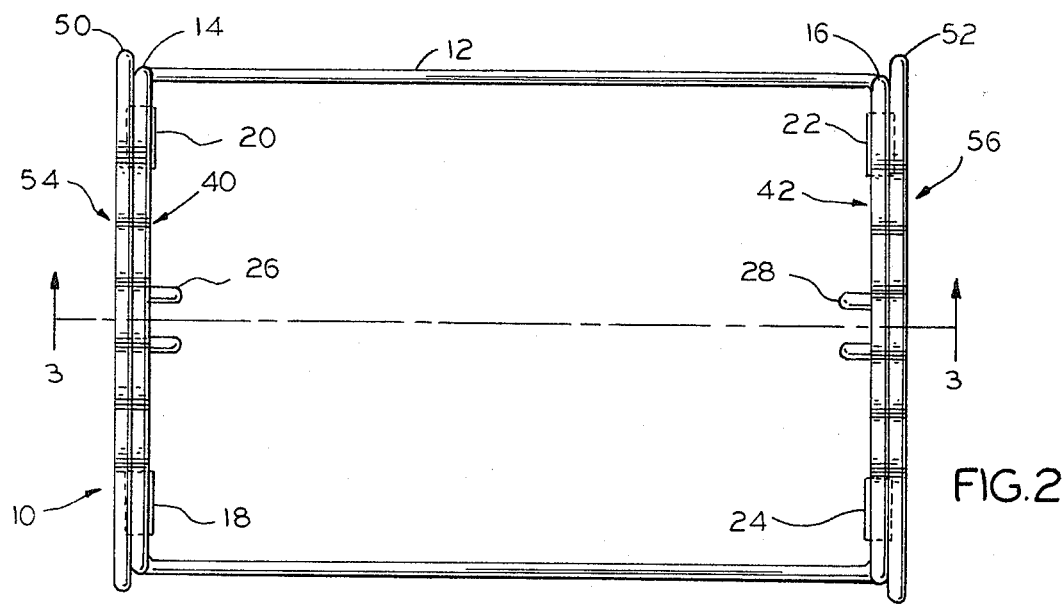
FIG. 2 is a top plan view of the rack in an open position.

A secondary panel 50, 52 is welded or otherwise secured to a corresponding one of the main panels 14, 16, with corresponding edges of the secondary frame at corresponding levels relative to the main frame. Again, each secondary panel may have one or more serpentine edges 54, 56 forming more opposing peaks and valleys for supporting skewers. For example, skewers 58, 60 (FIG. 1) are shown as being supported on the serpentine edges 54, 56. Depending upon the desired distance from the heat and the size of the supported object (here turkey 62), the skewers 58, 60 could be moved up to the serpentine edges 40, 42 on the main frame.

The secondary panels 50, 52 could also be formed with still other serpentine edges (as at 27, 29) so that the skewers 58, 60 could be moved down as well as up.

The length and heights of the serpentine edges, and the distances between the peaks and valleys are selected to accommodate a great variety of needs. For example, as here shown, a turkey is being supported by two of the skewers 58, 60. A very large roast might be supported on two levels, for example, and at any number of places along each level, thus making it possible to use of all four serpentine edges 40, 42, 54, 56. Very small potatoes, ears of corn, shish kabobs, and the like, may be skewered and the skewers may be laid side by side along all of the serpentine edges.

Thus, the inventive rack provides a support for a great variety of different foods. The air is free to circulate completely around the supported food with no restraints that might create convection currents which could result in an uneven heating. Moreover, the simple horizontal, rectangular form of wire the support frame 10 does not commit the rack to use with any other specific equipment and enables its use in a great variety of different places, such as inside an oven, over or adjacent a wood campfire, on charcoal burners, and the like. The rack may set in a large drip pan or a large drip pan may set in it. If the proper serpentine edge 40, 42, 54, 56 is used, and if the skewers are placed in the correct valleys of the serpentine edges, the roast may be perfectly centered in the oven by usually centering the rectangular frame 12.

Figure 5:
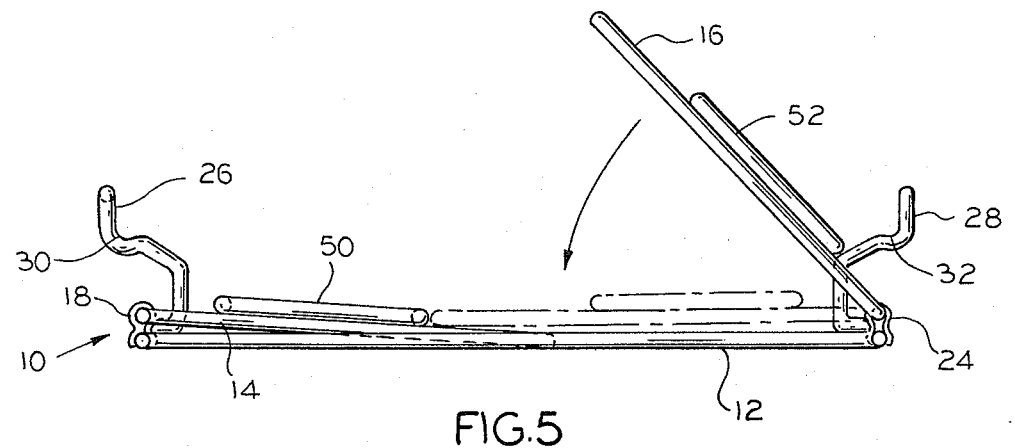
FIG. 5 is a stop motion view showing the rack being folded to a closed position.

After the rack is used and ready for storage, it is only necessary to press bars 27, 29 out of coves 30, 32 and to fold down (FIG. 5) the two main panels 14, 16 so that they lie over each other and within the space defined by the rectangular support frame 12. Also, when folded, the two secondary panels tend to come together into alignment in order to form a shelf which could be placed over, say, a campfire to provide a horizontal support for pots and pans. In this usage, the secondary frames 50, 52 cooperate to provide a relatively stable surface area.

In one exemplary rack which is currently enjoying commercial success, the dimensions of the rectangular support frame 12 is 12"×8", each main panel 14, 16 is 7" high, and each secondary frame 50, 52 is 3" high. The serpentine edges 52, 54 stand 5" above the rectangular frame 12. The rack is made from steel wire, about 3/16" diameter, which is welded together. Other racks may be made larger or smaller than this exemplary one.

Those who are skilled in the art will readily perceive how to modify the invention. Therefore, the appended claims are to be construed to cover all equivalent structures which fall within the true scope and spirit of the invention.

What is claimed:

1. A roasting rack comprising a generally horizontal rectangular support frame having main panels hinged to opposite ends thereof, each of said main panels having at least one secondary panel secured thereto in opposed alignment, at least one serpentine support edge formed along each upper edge of said main and secondary panels, said serpentine support edges forming opposing peaks and valleys to enable a spit or skewer to rest in corresponding opposed valleys, and latching means secured to each of the ends of said rectangular frame to hold said main panels in a generally vertical position.

2. A folding wire frame rack comprising a rectangular base having a main support panel connected by hinges to each of an opposed pair of ends, each of said main panels having a support edge opposite said hinges and formed of opposed peaks and valleys which cooperate to form a plurality of skewer support positions, a secondary panel welded to each of said main panels in positions which form support edges having opposed peaks and valleys along upper edges of said secondary panels, the support edges of said main panels and secondary panels being generally parallel, said secondary panels having lower edges which are displaced from the hinged locations where said main panels join the ends of said rectangular base, and latching means comprising upstanding locking supports welded to each of said ends in positions where the lower edges of said secondary panels snap into a locking position when said main panels are moved to an open position.

3. The rack of claim 1 or claim 2 wherein said latching means hold said main panels in an over center position so that any weight acting downwardly on said support edges tends to push said main panels into a more secure position.

4. The rack of claim 3 wherein each of said latching means comprises a cove for receiving a horizontal bar carried by a corresponding one of said main panels, said bar snapping into said cove when said main panels are in their vertical positions.

5. The rack of claim 1 wherein all parts are made of steel wire which is welded together.

* * * * *